June 13, 1950  T. C. GRAY  2,511,158
NONRIGID PIPE COUPLING
Filed Oct. 6, 1947
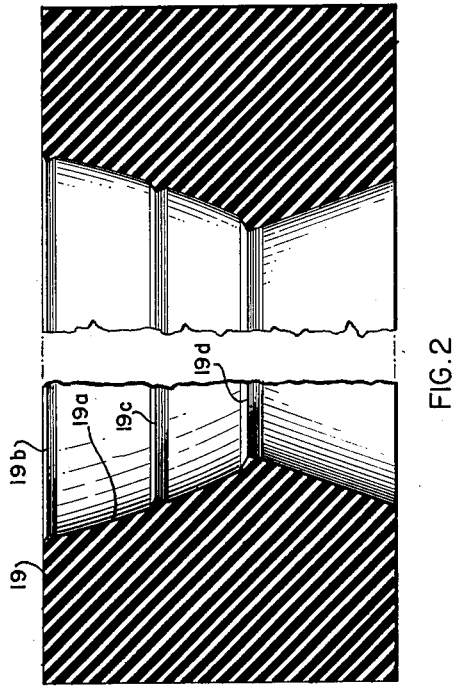
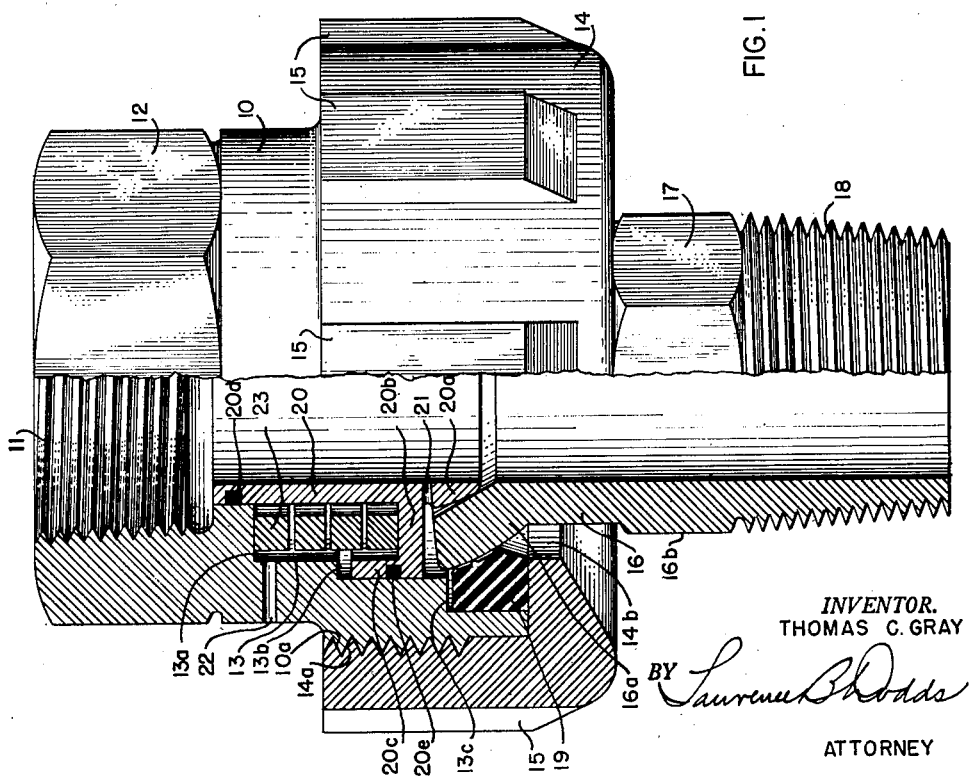
INVENTOR.
THOMAS C. GRAY
BY Laurence B Dodds
ATTORNEY Patented June 13, 1950

2,511,158

UNITED STATES PATENT OFFICE 2,511,158

NONRIGID PIPE COUPLING

Thomas C. Gray, Easton, Pa.

Application October 6, 1947, Serial No. 778,238

5 Claims. (Cl. 285—90)

This invention relates to non-rigid pipe couplings and, more particularly, to such couplings of the swivel type in which there is provided an unlimited rotational movement between the two pipe-connecting parts of the coupling but only a limited amount of angular movement. This invention relates further to an improved sealing gasket particularly suitable for use in the non-rigid pipe coupling of the invention.

Heretofore there have been devised and used numerous types of non-rigid pipe couplings. These have been of two general types, the flexible type, including a universal type joint which provided a relatively large amount of angular motion between the two pipe-connecting portions of the coupling together with an unlimited amount of rotation, and the swivel type referred to above. This invention is directed more particularly to the latter type, which comprises essentially a cup-shaped casing having a fluid passage in its base, an annular detachable cap for the casing, a hollow ball member having a stem extending through the cap, and an annular sealing gasket interposed between the ball member and the cap.

However, the swivel types of non-rigid pipe couplings heretofore proposed have had a number of disadvantages among which may be mentioned the characteristics that the amount of allowable angular flexing varied with the wear of the gasket; the degree of initial or "new-gasket" fluid tightness depended upon the wear of the gasket, the coupling initially being subject to considerable leakage with fluids other than steam, which tends to form a fluid-tight seal; the excessive wear on the point or line contacts of abutting parts of the coupling in those applications involving considerable swivelling rotation; and the liability of the coupling to damage or breakage by sudden axial shocks.

It is an object of the invention to provide a new and improved non-rigid fluid-tight pipe coupling of the swivel type which obviates one or more of the above-mentioned disadvantages of the prior art swivel-type couplings.

It is another object of the invention to provide a new and improved non-rigid fluid-tight pipe coupling which has one or more of the following advantageous characteristics: constant amount of angular flexing; constant resistance to angular flexing; substantial freedom from leakage at all times; minimum wear on relatively rotatable abutting parts of the coupling; and resilient reaction to sudden shocks and excessive strains.

It is a further object of the invention to provide a new and improved sealing gasket for a non-rigid pipe coupling of the type described, effective substantially to eliminate initial leakage in the coupling.

In accordance with the invention, a non-rigid fluid-tight pipe coupling comprises a cup-shaped casing having a fluid passage in its base, a detachable annular cap for the casing, and a hollow ball member having a stem extending through the cap. The coupling further includes an annular sealing gasket interposed between the ball and the casing and secured in place by the cap, a cylindrical follower extending between the passage in the casing and the ball, the casing having relatively widely spaced cylindrical guide surfaces to maintain the follower substantially coaxial therewith, and spring means interposed between the casing and the follower for biasing the follower into engagement with the ball member.

Further in accordance with the invention, there is provided for use in a non-rigid fluid-tight pipe coupling, for example, one of the type described in which the ball member has a spherical surface, an annular sealing gasket of material softer than the ball member and having an internal substantially spherical seating surface for the ball member. This spherical seating surface is formed with at least one, and preferably a plurality of, circular sealing ridges effective to form an initial substantially line contact with a ball member seated therein.

For a better understanding of the present invention, together with other and further objects thereof, reference is had to the following description taken in connection with the accompanying drawing and its scope will be pointed out in the appended claims.

Referring now to the drawing, Fig. 1 is a quarter-section elevation of a non-rigid fluid-tight pipe coupling embodying the invention; while Fig. 2 is a cross section of an annular sealing gasket suitable for use in the pipe coupling of Fig. 1.

Referring now more particularly to Fig. 1 of the drawing, there is illustrated a non-rigid fluid-tight pipe coupling embodying the invention. This coupling comprises a cup-shaped casing 10 having a fluid passage in its base such as the internally threaded pipe connection 11. The end of the casing 10 may be formed as a nut 12 for use in assembly, as described hereinafter. The casing 10 is also formed with a stepped cylindrical cavity 13, this cavity being formed, in the specific example illustrated, with four steps defined by the shoulders 13a, 13b, and 13c. The coupling assembly further includes a detachable annular cap 14 for the casing having internal threads 14a adapted to engage external threads 10a formed on the casing 10. The cap 14 is constructed in any suitable manner to provide for tightening it on the casing 10, for example, by the provision of external lugs 15 for engagement by a lug wrench.

The pipe coupling of the invention further includes a hollow ball member 16 terminating at its upper end in a segment of a spherical annulus 16a having a spherical seating surface and having a stem 16b extending through the opening 14b in the cap 14. The stem 16b may be provided with a nut portion 17 and a terminal external pipe thread 18 for connection to a suitable pipe or pipe fixture. Interposed between the portion 16a of the ball member 16 and the cap 14 is an annular sealing gasket 19, which is described in more detail hereinafter with reference to Fig. 2.

The pipe coupling of Fig. 1 also includes a cylindrical follower 20 extending essentially from the connecting passage in the casing 10 to the upper portion of the ball member 16. Specifically, the follower 20 slidingly engages the uppermost portion of the stepped cylindrical cavity 13 and terminates at its lower end in an annular portion 20a having a cross-section with an arcuate external periphery which pivotally engages the inner spherical surface of the annular portion 16a of the ball member 16. The follower 20 has a radially extending flange portion 20b terminating in an annular guiding flange 20c which slidingly engages an intermediate cylindrical surface of the stepped cavity 13 of the casing 10. In other words, the two sections of the cavity 13 just referred to form relatively widely spaced cylindrical guide surfaces for the follower 20 and also serve as a cylinder in which the follower 20 and its annular flange 20c function as a piston. This arrangement also serves to maintain the follower 20 in precise axial alignment with the cylindrical cavity 13. At the same time, the step 13b of the cavity 13 comprises a radially extending stop surface effective to limit axial movement of the follower 20 in the upward direction. To obtain a piston action of the elements described, there is provided a fluid port 21 from the interior of the follower 20 to the cylindrical cavity 13 below the flange 20b of the follower and there is provided also a drainage or atmospheric vent 22 from the cyindrical cavity 13a above the flange 20b while the follower 20 may be provided with piston rings or packings 20d, 20e to assure proper operation as a piston.

As may be seen from Fig. 1 of the drawing, the under surface of the flange 20b of the ball member 16 also serves as a stop surface disposed to engage the inner or uppermost end surface of the ball member 16 upon its deflection and thereby to limit the angular movement of the ball member 16 relative to the casing 10.

The pipe coupling of Fig. 1 also includes a spring means, specifically a helical spring 23, interposed between the casing 10 and the follower 20, specifically being disposed in the annular cylinder above the flange 20b so that it is completely enclosed within the cylindrical cavity 13a and is normally protected from the fluid passing through the coupling. This spring 23 is effective to bias the follower 20 into engagement with the upper portion 16a of the ball member 16 to prevent substantial leakage at this point, although this connection need not necessarily be an absolute fluid-tight connection since any leakage past this joint must also pass the piston follower 20. The spring 23 is preferably given a static spring constant proportioned to prevent axial movement of the follower 20 for normal angular stresses on the ball member 16; that is, the lower surface of the flange 20b of the follower 20 normally serves as a positive stop for the upper surface of the ball member 16 and thus limits the normal angular flexing of the ball member 16.

The admission of the fluid under pressure through the port 21 below the annular piston 20 serves to react on the upper portion of the ball member 16 and thus aid the spring 23 in maintaining the ball member firmly seated in the gasket 19.

Referring now to Fig. 2, there is illustrated the annular sealing gasket 19 of Fig. 1 on an enlarged scale. This sealing gasket is of material softer than that of the ball member 16 and may be of any of various materials in accordance with the requirements of the particular application, among which may be mentioned molded plastic, lead, bearing bronze, cast iron, etc. The gasket 19 is provided with an internal, substantially spherical seating surface 19a complementary to the spherical seating surface of the portion 16a of the ball member. The gasket 19 is formed with at least one and, as illustrated, three spaced circular sealing ridges 19b, 19c, and 19d. These sealing ridges are very much enlarged in the drawing for the sake of clarity and, in practice, may be only a few thousandths of an inch in height. For example, in a ¾ inch pipe coupling, the ridges 19b, 19c, and 19d have been given heights of 0.002 inch, 0.003 inch, and 0.004 inch, respectively. Due to the fact that the material of the gasket is considerably softer than that of the ball member 16, the pressure of the follower 20 on the ball member, due to the biasing spring 23, is effective initially to form a substantially circular line contact between the ball member 16 and one or more of the sealing ridges 19d, depending upon the pressure. As the gasket 19 wears with continued use, the ball member 16 ultimately wears away the sealing ridges 19b, 19c, and 19d as it simultaneously wears a spherical seating surface in the body proper of the gasket 19.

It is believed that the method of assembly and the general principles of operation of the pipe coupling will be evident from the foregoing detailed description. It will also be evident that the improved pipe coupling of the invention, including the improved sealing gasket, obviates the disadvantages of the prior art flexible or swivel-type pipe couplings described above, namely, as the gasket 19 wears in use and the ball member 16 retreats with such wear, the follower member 20 follows such wear and the annular flange 20b serves always as a constant stop permitting a constant degree of angular flexing irrespective of this wear of the gasket. Also, the resistance to flexing of the coupling depends substantially solely upon the friction between the ball member 16 and the gasket 19. This friction, in turn, is dependent primarily upon the spring pressure exerted by the biasing spring 23, which does not vary significantly with wear of the gasket 19, and is independent of the degree to which the cap 14 is tightened on the casing 10. As illustrated, this cap may be tightened until the lower surface of the casing 10 engages the internal surface of the cap 14.

Further, in the pipe coupling of the invention including the gasket of Fig. 2, the coupling is substantially fluid-tight from its initial assembly, obviating the necessity for wearing a sealing seat between the ball member 16 and gasket 19 to obtain a fluid-tight joint. Further, the coupling maintains this fluid tightness through all degrees of wear. As the ball member 16 is rotated with rotation of the associated piping or fixtures, the follower 20 rotates with it, rotating in the cylindrical cavity 13, thus avoiding excessive wear between the follower 20 and the ball member 16 which might be occasioned in installations where there was a considerable amount of relative rotation between the parts. Furthermore, if the ball member 16 or the casing 10 is subjected to an axial shock or blow, the principal reaction is absorbed by the spring 23 while, at the same time, a substantially fluid-tight joint is maintained between the follower 20 and the cylindrical cavity 13 of the casing 10 and between the portion 20a of the follower and the portion 16a of the ball member. Further, while the flange 20b of the follower 20 normally limits the degree of angular flexing of the ball member 16 relative to the casing 10, if the ball member 16 is given an excessive angular shock or blow this is absorbed by the spring 23 permitting momentary abnormal relative angular flexing of the parts.

The construction described provides a pipe coupling very much smaller and lighter in weight than prior art couplings of this type. One of the features that contributes to this result is the design of the ball member with external threads, permitting the use of a much smaller gasket and casing. This construction, in turn, materially reduces the flexing and swivelling moments which vary as the cube of the ball diameter.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A non-rigid fluid-tight pipe coupling comprising: a cup-shaped casing having a fluid passage in its base; a detachable annular cap for said casing; a passaged ball member having a stem extending through said cap; an annular sealing gasket interposed between said ball member and said cap; a cylindrical follower having one end bearing directly on the inner surface of said ball member and having a continuous cylindrical passage extending between the passages in said casing and said ball member and freely movable to follow movement of said ball member with wearing of said gasket; said casing having spaced cylindrical guide surfaces engaging said follower to maintain said follower substantially coaxial therewith; and spring means interposed between said casing and said follower for biasing said follower into engagement with said ball member.

2. A non-rigid fluid-tight pipe coupling comprising: a cup-shaped casing having a fluid passage in its base; a detachable annular cap for said casing; a passaged ball member having a stem extending through said cap; an annular sealing gasket interposed between said ball member and said cap; a cylindrical follower having a passage extending between the passages in said casing and said ball member and movable to follow movement of said ball member with wearing of said gasket; said casing having spaced cylindrical guide surfaces engaging said follower to maintain said follower substantially coaxial therewith; a stop surface on said follower disposed to engage the inner end surface of said ball member upon deflection and limit the angular deflection thereof; and spring means interposed between said casing and said follower for biasing said follower into engagement with said ball member.

3. A non-rigid fluid-tight pipe coupling comprising: a cup-shaped casing having a fluid passage in its base and a stepped cylindrical cavity; a detachable annular cap for said casing; a passaged ball member having a stem extending through said cap; an annular sealing gasket interposed between said ball member and said cap; a cylindrical follower slidingly engaging the uppermost cylindrical surface of said casing and pivotally engaging the inner passage of said ball member; said follower having a radially extending cylindrical flange slidingly engaging a second cylindrical surface of said casing to form an annular cylinder and piston; and spring means disposed in said annular cylinder for biasing said follower into engagement with said ball member.

4. In a non-rigid fluid-tight pipe coupling including a ball member having a spherical surface: an annular sealing gasket of material softer than the ball member, having an internal substantially spherical seating surface for the ball member, and formed with at least one circular sealing ridge effective to form an initial substantially line contact with a ball member seated therein.

5. In a non-rigid fluid-tight pipe coupling including a ball member having a spherical surface: an annular sealing gasket of material softer than the ball member, having an internal substantially spherical seating surface for the ball member, and formed with a plurality of spaced progressively higher circular sealing ridges effective to form successively initial substantially line contacts with a ball member seated therein.

THOMAS C. GRAY.

REFERENCES CITED

The following references are of record in the file of this patent:

UNITED STATES PATENTS

| Number | Name | Date |
|---|---|---|
| 553,509 | Burnham | Jan. 28, 1896 |
| 733,065 | Martin | July 7, 1903 |
| 787,391 | Niederlander | Apr. 18, 1905 |
| 897,461 | Greenlaw et al. | Sept. 1, 1908 |
| 927,462 | Greenlaw | July 6, 1909 |
| 1,154,984 | Forth | Sept. 28, 1915 |
| 1,926,270 | Eastman | Sept. 12, 1933 |
| 1,928,279 | Bard | Sept. 26, 1933 |